US008216664B2

(12) United States Patent
Graff

(10) Patent No.: US 8,216,664 B2
(45) Date of Patent: Jul. 10, 2012

(54) CREPED ABSORBENT PAPER SHEET, ROLL FOR EMBOSSING SUCH A SHEET AND EMBOSSING PROCESS

(75) Inventor: Pierre Graff, Wolfgantzen (FR)

(73) Assignee: Georgia-Pacific France (FR)

( * ) Notice: Subject to any disclaimer, the term of this patent is extended or adjusted under 35 U.S.C. 154(b) by 371 days.

(21) Appl. No.: 12/668,501

(22) PCT Filed: Jun. 23, 2008

(86) PCT No.: PCT/FR2008/000878
§ 371 (c)(1),
(2), (4) Date: Jan. 11, 2010

(87) PCT Pub. No.: WO2009/016274
PCT Pub. Date: Feb. 5, 2009

(65) Prior Publication Data

US 2010/0136291 A1 Jun. 3, 2010

(30) Foreign Application Priority Data

Jul. 13, 2007 (FR) .................................... 07 05080

(51) Int. Cl.

| | |
|---|---|
| ***B32B 3/00*** | (2006.01) |
| ***B29C 59/04*** | (2006.01) |
| ***B31F 1/00*** | (2006.01) |
| ***B28B 3/12*** | (2006.01) |

(52) U.S. Cl. ........ 428/166; 428/154; 428/172; 425/194; 425/363; 156/209; 162/109; 162/111; 162/113

(58) Field of Classification Search .................. 428/154, 428/156, 166, 172; 425/194, 363; 162/109, 162/111, 113; 156/209
See application file for complete search history.

(56) References Cited

U.S. PATENT DOCUMENTS

2003/0021953 A1* 1/2003 Graff ........................... 428/153

FOREIGN PATENT DOCUMENTS

EP 0935021 A1 8/1999

(Continued)

OTHER PUBLICATIONS

English Abstract for FR2684599(A1); Publication date: Jun. 11, 1993; 1 pg.

(Continued)

*Primary Examiner* — Donald J Loney
(74) *Attorney, Agent, or Firm* — Laura L. Bozek

(57) ABSTRACT

An embossed sheet is composed of at least a first and a second ply of creped tissue having a basis weight between 12 and 30 g/m$^2$ according to which the first ply has a first embossed pattern composed of a series of first aligned protrusions of frustoconical overall shape, the tops of which are oriented towards the inside of the sheet, and the second ply has a first and a second series of protrusions, the tops of which are oriented towards the inside of the sheet, the second series having a height greater than that of the first series of protrusions. The protrusions of the first ply and the highest protrusions of the second ply are nested inside one another, and the lowest protrusions of the second ply are arranged between the protrusions of the first ply so as to create empty spaces between the two plies and promote a rapid absorption of liquid.

10 Claims, 4 Drawing Sheets

FOREIGN PATENT DOCUMENTS

| | | | |
|---|---|---|---|
| EP | 1081284 | A1 | 3/2001 |
| EP | 1236830 | A1 | 9/2002 |
| EP | 1319748 | A1 | 6/2003 |
| FR | 2684599 | A1 | 6/1993 |

OTHER PUBLICATIONS

English Abstract for EP1236830(A1); Publication date: Sep. 4, 2002; 1 pg.

English Abstract for EP1081284(A1); Publication date: Mar. 7, 2001; 1 pg.

English Abstract for EP0935021(A1); Publication date: Aug. 11, 1999; 1 pg.

English Abstract for EP1319748(A1); Publication date: Jun. 18, 2003; 1 pg.

PCT International Search Report and Written Opinion for International Application No. PCT/FR2008/000878; International Filing date: Jun. 23, 2008; Date of Mailing: Mar. 12, 2009; 15 pgs.

* cited by examiner

CREPED ABSORBENT PAPER SHEET, ROLL FOR EMBOSSING SUCH A SHEET AND EMBOSSING PROCESS

BACKGROUND OF THE INVENTION

The invention relates to a sheet of paper, especially a sheet of absorbent paper made of creped tissue, having an embossed pattern.

The invention relates in particular to a sheet of paper composed of at least a first and a second ply of creped tissue, intended for the field of wiping in a household, domestic or industrial application, that is to say capable of being used as kitchen roll, or towel, for example.

In the field of paper for sanitary or domestic use such as toilet paper or kitchen roll, it is known to produce sheets of paper composed of several plies of absorbent paper, for example made of creped tissue having a basis weight between 12 and 30 g/m$^2$, provided with protrusions that are obtained by embossing.

This is because embossing gives bulk to the sheet and it improves the absorption of liquids, the feel and the softness. Attempts have been made to increase the absorption capacity still further by creating multilayer sheets which are obtained by combining at least two layers, also known as plies, each consisting of at least one of said embossed sheets.

Thus, a multilayer (or multiply) sheet is obtained which has given mechanical properties such as tensile strength and also absorption capacity.

Two methods of embossing and assembling the plies are commonly used depending on the desired properties of the end product.

The first is known in the field by the name "nested". It consists firstly in embossing each of the plies separately so as to form, at the surface, protrusions which are generally substantially frustoconical or in the form of pyramid frustums. Next, adhesive is applied to the top of the protrusions of one of the plies, and the plies are arranged so that the faces having the protrusions face each other, the protrusions of one being between the protrusions of the other. Finally, the plies are assembled so that the protrusions that have been coated with adhesive nest between the protrusions of the other ply. Thus, the two plies are joined together by spots of adhesive between the tops of the protrusions of one ply and the unembossed regions between the protrusions of the other ply. A structure is produced in which the voids thus formed are able to give the sheet better absorption. Furthermore, the outer faces have a smooth and soft feel due to the hollow regions formed by the back of the protrusions. This technique is illustrated, for example, by Patent U.S. Pat. No. 3,867,225.

The second method of assembly is known in the field under the name "point-to-point". It differs from the preceding method by the relative arrangement of the two plies. These, after they have been separately embossed, are brought together in such a way as to make the tops of the protrusions, or at least part of these tops, coincide. The plies are joined together by the tops of the protrusions, point-to-point. This technique is illustrated by Patent U.S. Pat. No. 3,414,459.

When the practical realizations of these structures are considered, whether they are of the nested or point-to-point type, the protrusions obtained during embossing are usually produced so as to be distributed in a pattern in which the protrusions are generally aligned in one or more directions, uniformly. Such a pattern makes it possible to obtain a sheet that is homogeneous as regards its mechanical properties.

However, in order to improve user satisfaction, it is important to increase the flexibility, also called "the bulk" of the sheet.

The flexibility of the sheet can be defined as being its ability to deform uniformly when it is placed in the hand of a user, their fingers being stretched out as an extension of their palm and when the user then closes their fingers.

A sheet of paper which has a high flexibility will then deform and bend or curve so as to remain substantially parallel to the shape determined by the inside of the palm of the user's hand.

A sheet of paper that has poor flexibility will fold along one or more lines, each portion of the sheet which extends between two fold lines remaining substantially flat.

A sheet of paper that has high flexibility is more pleasant to use.

Also known is an embossed multiply sheet such as described in Patent Application EP 1 236 830 A1 in which at least one first ply has a first embossed pattern consisting of a first series of first protrusions of frustoconical overall shape projecting from the inner face of the first ply, which in particular form first alignments and the tops of which are joined to the inner face of the second ply opposite each other; the two plies each have a second embossed pattern made up of a second series of second protrusions of frustoconical overall shape projecting from the inner face of the corresponding ply, and in that the tops of the second protrusions of one ply extend opposite and near the tops of the second protrusions of the other ply.

BRIEF DESCRIPTION OF THE INVENTION

An embodiment of the invention includes an embossed paper sheet with improved absorption of the sheet without however decreasing its mechanical properties and which remains visually attractive.

An embodiment of the invention includes an embossed sheet composed of at least a first and a second ply of creped tissue having a basis weight between 12 and 30 g/m$^2$ according to which the first ply has a first embossed pattern composed of a series of first aligned protrusions of frustoconical overall shape, the tops of which are oriented towards the inside of the sheet, the second ply comprises a first and a second series of protrusions, the tops of which are oriented towards the inside of the sheet, of which the second series have a height greater than that of the first series of protrusions.

In accordance with an embodiment of the invention, the protrusions of the first ply and the highest protrusions of the second ply are nested inside one another, and the lowest protrusions of the second ply are arranged between the protrusions of the first ply so as to create empty spaces between the two plies and promote a rapid absorption of liquid.

According to other features of the invention:

- the protrusions of the first ply form series of circles;
- preferably said circles are concentric in a set of at least 3, alternatively 4, circles;
- according to one embodiment of the invention, the outermost circles of the sets have tangents;
- advantageously, the first ply comprises, in addition, embossed protrusions arranged between the series of circles, preferably forming square alignments;
- according to and embodiment of the invention, the lowest protrusions of the second ply have a density greater than 30 protrusions/cm$^2$;
- in agreement with one mode of the invention, the highest protrusions of the second ply form series of concentric circles in a set of at least 3;

- thus, the series of circles are juxtaposed and tangent, the lowest protrusions are juxtaposed in said spaces between the series of circles;
- in an embodiment, some of the highest protrusions of the second ply are arranged among the lowest protrusions of the second ply, nested with respect to the protrusions of the first ply and arranged between the series of concentric circles; and
- in an embodiment, the second ply includes, in addition, a third series of protrusions having the overall shape of a low wall that projects from the inner face of the sheet, and of which each joins together two higher protrusions which form concentric circles.

In an embodiment, the invention also provides a pair of engraved rolls for embossing an embossed sheet of which the first roll includes a first series of large pins of frustoconical overall shape that form first juxtaposed sets of concentric circular alignments and second large pins arranged between said concentric sets, and of which the second roll includes a series of large pins of frustoconical overall shape that form second juxtaposed sets of concentric circular alignments, and a series of small pins arranged between said second sets.

In accordance with an embodiment of the invention, the second roll includes, in addition, third pins arranged in the region at the center of the small pins, and in order to emboss the plies, the second rolls are keyed so that the large pins of each roll are nested and the third pins of the second roll and the second large pins of the first roll are also nested.

In an embodiment, the invention provides a process for manufacturing an embossed sheet by means of a pair of rolls such as defined previously.

BRIEF DESCRIPTION OF THE DRAWINGS

Other features, details and advantages of the invention will appear on reading the detailed description which follows, for an understanding of which reference will be made to the appended drawings among which.

DETAILED DESCRIPTION OF THE INVENTION

Figure 1:
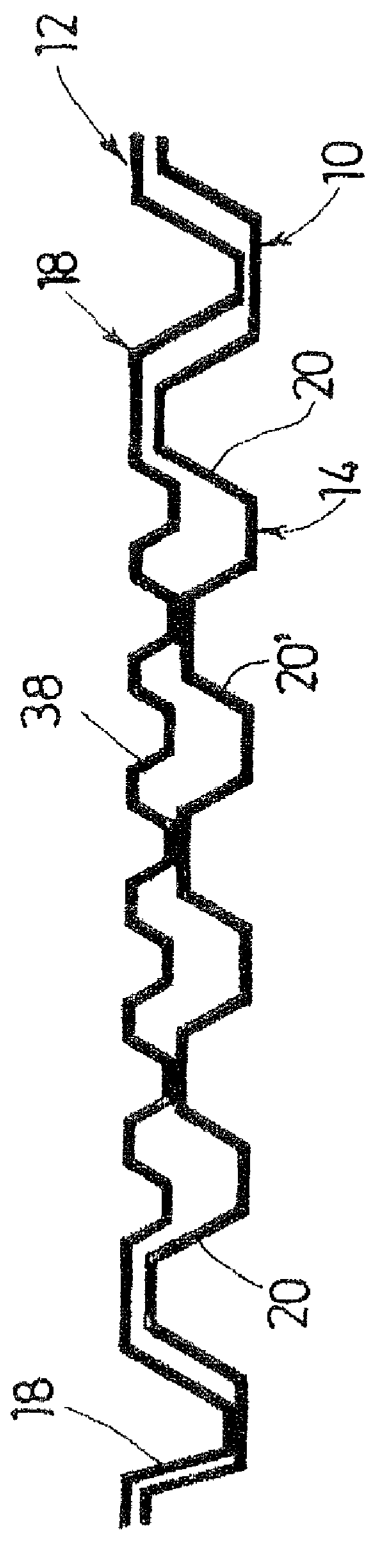
FIG. 1 PRIOR ART
FIG. 1 is a schematic section through the thickness of a tissue sheet according to the prior art.

FIG. 1 therefore shows, in cross section, a sheet according to the prior art, such as described in European Patent Application EP 1 236 830 A1.

The sheet 10 of embossed paper has a first upper ply 12 and a second lower ply 14 made of creped tissue, intended for any type of hygiene or household products.

The tissue, having a basis weight between 12 and 30 g/m$^2$, is preferably of the type obtained by conventional wet pressing, known as CWP.

More particularly, the sheet of paper 10 represented in FIG. 1 is, for example, intended to be incorporated into a roll of kitchen towel.

A first embossed pattern of each ply 12 and 14, of known overall design, is composed of first series of first protrusions 18 and 20, of frustoconical overall shape, projecting from the inner face of the corresponding ply 12, 14 while thus extending towards the inside of the sheet 10.

The first protrusions 18 and 20 in particular form first alignments in shapes, particularly in closed loops which in this instance are circles.

Here, according to FIG. 1, associated series of first protrusions 18, 20 of each of the plies 12, 14 are nested, concentrically, between the associated series of protrusions 20, 18 of the other 14, 12 of the two plies.

The first series of first protrusions 18 and 20 may be aligned in two main directions so as to define a grid. The two main directions are in this instance perpendicular to one another, and are inclined at 45° relative to the longitudinal L and transverse T directions of the sheet 10 as will be explained in greater detail below.

According to a known technique, the first protrusions 18, 20 forming the components of the first pattern are obtained by embossing the first 12 and second 14 plies of the sheet 10 respectively, by means of a pair of rolls such as that which is commonly known.

Thus, pins corresponding to the protrusions that it is desired to obtain on the first 12 and second 14 plies of the sheet 10 are formed in relief on the outer convex cylindrical face of the associated roll.

In order to produce the series of first protrusions 18 on the first ply 12 of the sheet 10, the embossing roll has, on its convex cylindrical face, a first homologous series of pins in relief and of frustoconical overall shape in relief, which are distributed in concentric circles in the first alignments of the first protrusions 18, so as to produce the corresponding part of the first pattern of the first ply 12.

Similarly, the series of protrusions 20 on the second ply 14 of the sheet 10 is produced by another embossing roll, of which the frustoconical pins in relief can be, are distributed in concentric circles.

In accordance with the teaching of this prior art, the first ply 12 has a second embossed pattern composed of second series of second protrusions 38, of frustoconical overall shape projecting from the inner face of the first ply 12, while thus extending towards the inside of the sheet 10.

The second protrusions 38 are produced in a similar way to the first protrusions 18 and 20, especially by a second series of second pins of frustoconical shape which extend over the convex surface of the second embossing roll.

When they are arranged opposite the protrusions 20 of the second ply 14, the protrusions 38 have a tendency to reduce the height of the protrusions 20: such protrusions are referenced 20' in FIG. 1.

The protrusions 18 of the first ply 12 and the protrusions 20 of the second ply 14 are nested inside one another.

Figure 2:
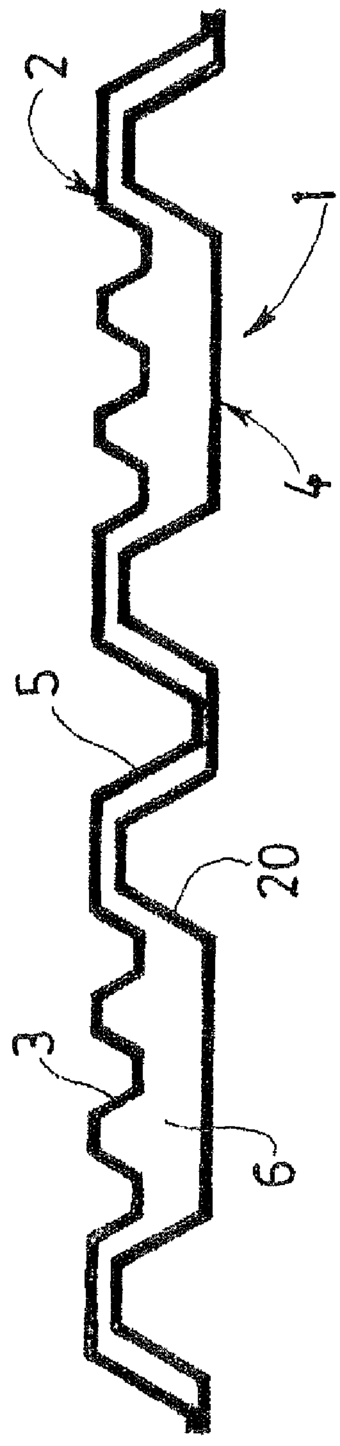
FIG. 2 is a schematic section through the thickness of a multiply sheet according to one embodiment of the invention.

The present invention, including an embodiment of a sheet cut along its thickness, is represented in FIG. 2 and has the following characteristics.

Figure 3:
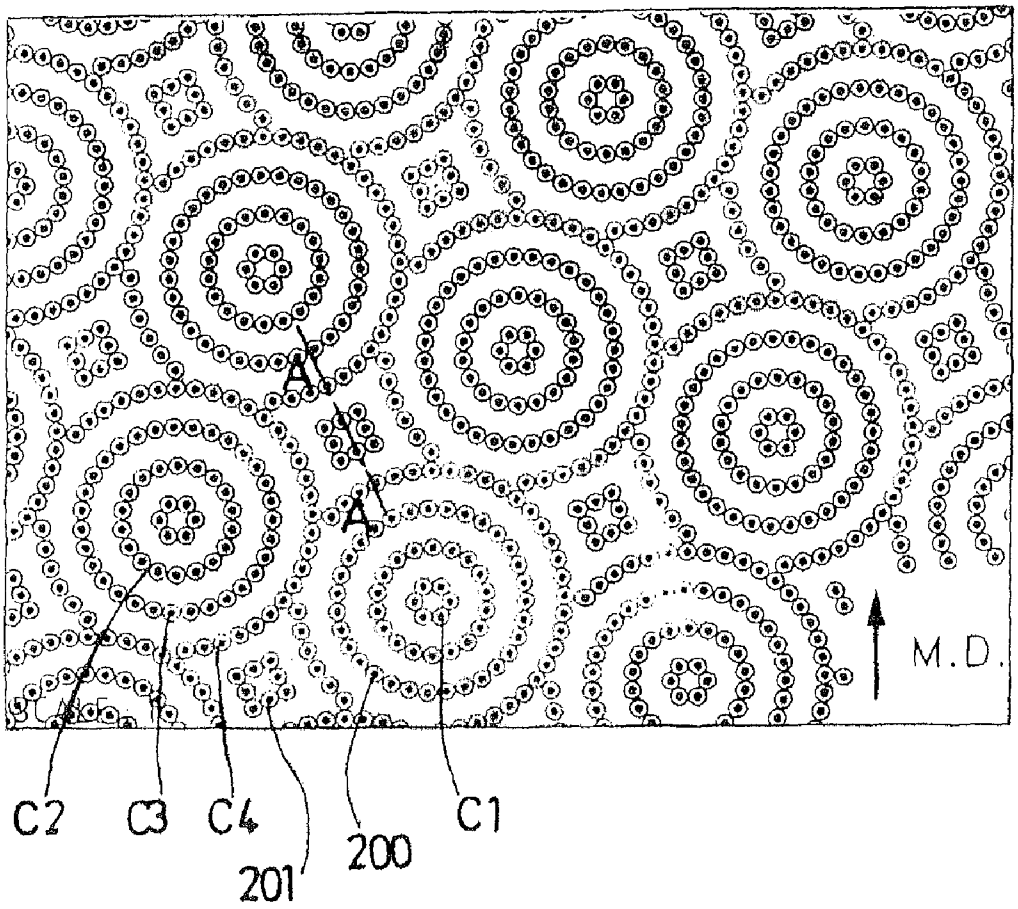
FIG. 3 is an illustrative planar view of the engraving of an embossing roll used according to an embodiment of the invention.

The first ply 4 includes a first series of protrusions 20 of frustoconical overall shape of which the tops are oriented towards the inside of the ply 1 and which may be arranged as illustrated in FIG. 3, namely by forming alignments.

By way of example, the protrusions 20 may have a height of around 0.8 mm and a surface area at the top of around 2 mm$^2$ with an average density of around 4/cm$^2$. In the particular case represented here, found between the series of circles is around eight first protrusions 20 grouped over a surface area of around 1 cm$^2$.

The second ply 2 includes a first and a second series of protrusions respectively marked 3 and 5, of which the tops are all oriented towards the inside of the sheet, the second series of protrusions 5 having a height greater than that of the first series 3.

By way of illustration, the first protrusions 3 having a rounded surface at the top have a height of around 0.4 mm and a density of around 30 $cm^2$. The second protrusions 5 have a geometry and a density closer to those of the protrusions 20 of the first ply 4.

In accordance with one advantageous aspect of the invention, the second protrusions 5 (the highest) of the second ply 2 are positioned nested with respect to the protrusions 20 of the first ply 4. One particularly favorable arrangement will be described in relation to FIGS. 3 and 4.

Figure 5:
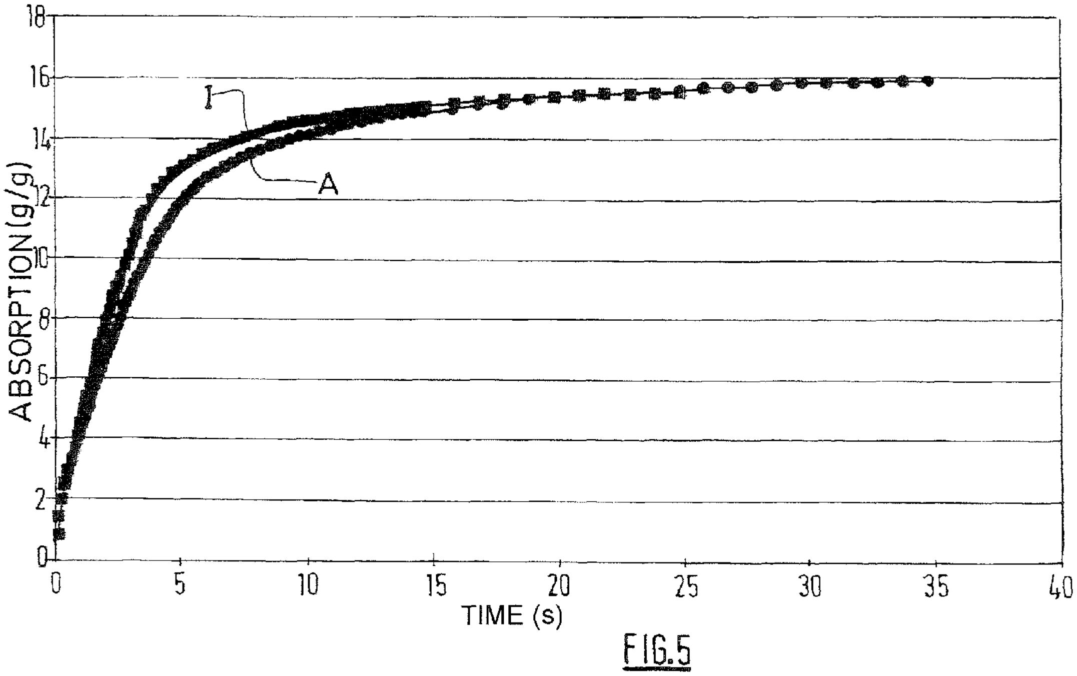
FIG. 5 gives comparative curves relating to the absorption of a sheet according to the prior art and of a sheet according to an embodiment of the invention.

Moreover, the first protrusions (the lowest) 3 of the second ply 2 are placed between the protrusions 20 of the first ply, so as to form voids or pockets 6 between the plies which promote the rapidity of the absorption of liquids as is proved especially by the curve from FIG. 5.

Such an arrangement of the protrusions improves the hold of the "small" protrusions 3 of the second ply 2 which are here closely held between the largest protrusions 5. The structure thus formed collapses less quickly in the wet state, which accelerates the passage of liquid to the inside of the structure, thus accelerating the rate of absorption of the sheet.

Figure 4:
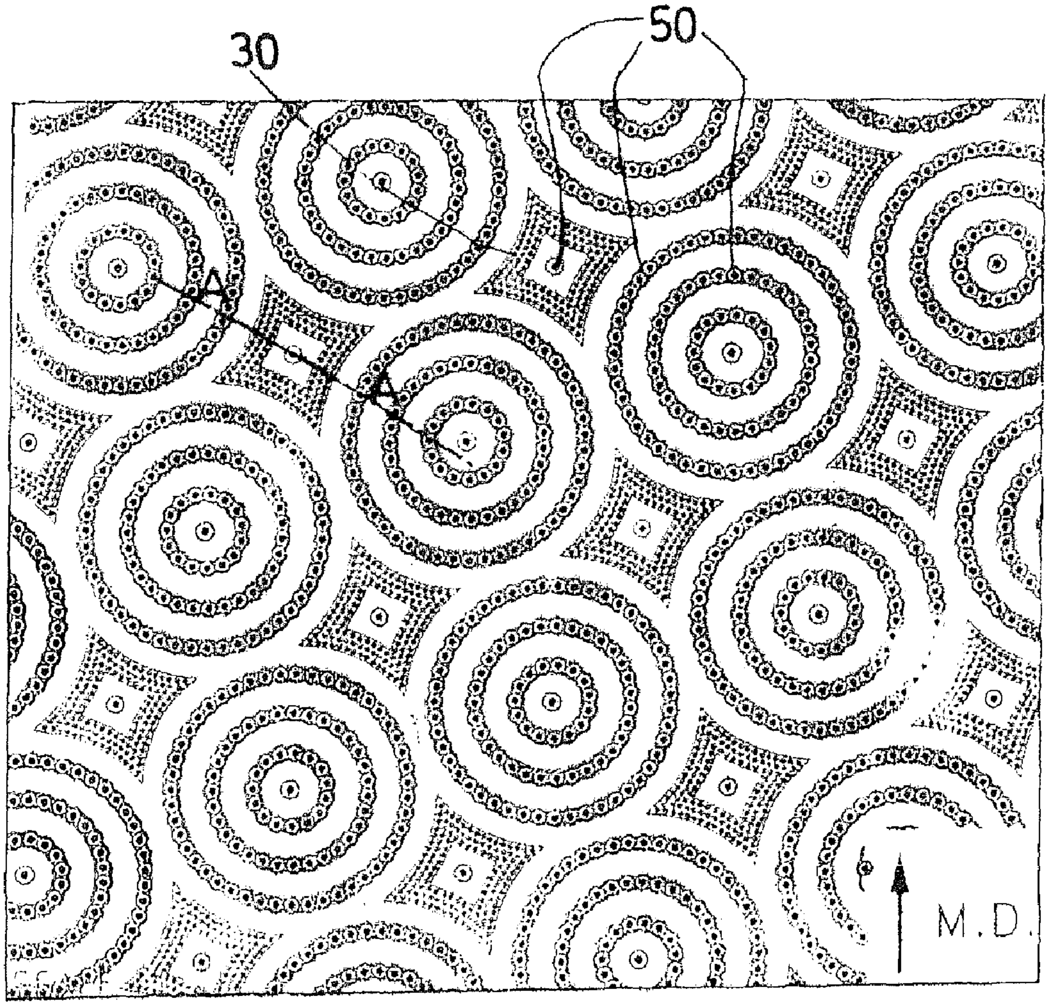
FIG. 4 is a planar view of the engraving of the other embossing roll used according to an embodiment of the invention.

FIGS. 3 and 4 illustrate one particularly favorable arrangement of the pins of each of the rolls used to form each of the outer plies of the embossed sheet according to the invention.

According to FIG. 3, which illustrates the embossed pattern of the first ply 4 seen from above, the pins 200 are mostly aligned in circles and more precisely concentric circles C1, C2, C3 and C4, here sets of four concentric circles.

The sets of circles being generally juxtaposed, the outermost circles C4 of said sets are tangent in certain places.

Furthermore, pins 201, of the same type as pins 200 forming the circles, are provided between the sets of circles, and preferably form squares.

FIG. 4 shows the embossed pattern of the second ply 2, having, in particular, a set of large pins 50 which form the highest protrusions 5 on the second ply, and a set of small pins 30 which create the "small" protrusions 3 of the second ply.

The large pins 50 form in this instance sets of three juxtaposed concentric circles.

The small pins 30 are arranged in the areas between the sets of concentric circles; they are engraved in sorts of squares, the center of which includes a large pin 50.

FIG. 2 is a cross section of a sheet obtained by the rolls of FIGS. 3 and 4, along the line AA.

In order to simplify things to a degree, it may be considered that FIGS. 3 and 4 represent the embossed patterns of the first and of the second ply respectively.

Thus, the concentric circles C1, C2, C3 and C4 correspond to the sets of circles C'1, C'2, C'3 and C'4, formed by the protrusions 20 of the first ply 4.

Thus, in accordance with an embodiment of the invention, the patterns of each of the plies 2, 4 are complementary, and fitted to one another so as to promote rapid absorption of liquid inside the plies, as is clearly shown by the curves from FIG. 5.

The two curves from FIG. 5 are given as the absorption A in g/g of a sheet as a function of time t in s.

In accordance with the tests carried out with respect to the absorption, the sample was laid flat on a porous, sintered glass sheet of which the pore size was determined to be 40 μm. A plate bearing weights was laid on the sample in order to keep the sample flat. The sample was thus slightly compressed. The porous sheet rested on a plate which had, in its center, an orifice of diameter equal to 3 mm into which a flexible tube opened from beneath in order thus to place the volume of the porous sheet in communication with a reservoir of liquid, the height level of which could be adjusted with respect to the level of the porous sheet. The reservoir was itself placed on a balance. This means made it possible to determine the amount of liquid which passed into the sample when the reservoir was raised relative to the porous sheet.

The liquid was water containing 9 g/l of sodium chloride.

The procedure involved impregnating the sample through the porous sheet while lowering the level of the sample relative to the reservoir. The amount of liquid absorbed was measured every ten seconds simply by measuring the loss of water from the reservoir. This was carried out with various weights.

Measurements of the absorption capacity may also be carried out without applying pressure.

In FIG. 5, the curve I relates to an embodiment of the invention and the curve A to the prior art, more precisely a sheet such as represented in transverse cross section in FIG. 1.

It is seen that the curve I has a slope that is initially larger than the curve A which means that the sheet according to the invention has an absorption rate that is higher than a sheet according to the prior art.

This feature can be very important, or even determining, for purchasers, and users of this type of product.

Furthermore, the protrusions 20 of the first ply 4 may be joined together by components in relief such as disclosed, for example, in Application EP 1 101 866 A1.

This feature makes it possible to obtain a more pronounced embossed pattern.

The invention claimed is:

1. An embossed sheet, comprising:

at least a first and a second ply of creped tissue having a basis weight between 12 and 30 g/$m^2$;

wherein the first ply has a first embossed pattern comprising a series of first aligned protrusions of frustoconical overall shape, the tops of which are oriented towards an inside of the sheet;

wherein the second ply comprises a first and a second series of protrusions, the tops of which are oriented towards the inside of the sheet, the second series of protrusions having a height greater than that of the first series of protrusions;

wherein the first aligned protrusions of the first ply form series of circles that are concentric in a set of at least 3, circles;

wherein highest protrusions of the second ply form series of concentric circles in a set of at least 3, disposed complementary and concentric with respective circles of the series of circles of the first ply;

wherein the first aligned protrusions of the first ply and the highest protrusions of the second ply are nested with respect to one another, in that lowest protrusions of the second ply are arranged between the first aligned protrusions of the first ply in spaces between the complementary series of circles;

wherein a subset of the first aligned protrusions of the first ply are arranged in the spaces between the complementary series of circles, in that some of the highest protrusions of the second ply are arranged among the lowest protrusions of the second ply, nested with respect to the subset of the first aligned protrusions of the first ply arranged in the spaces between the complementary series of circles, so as to create empty spaces between the two plies and promote a rapid absorption of liquid.

2. The sheet according to claim 1, wherein outermost circles of the complementary sets of circles are tangentially disposed with respect to one another.

3. The sheet according to claim 1, wherein the subset of the first aligned protrusions arranged between the complementary series of circles form square alignments.

4. The sheet according to claim 1, wherein the lowest protrusions of the second ply have a density greater than 30 protrusions/$cm^2$.

5. The sheet according to claim 1, wherein the complementary series of circles are juxtaposed and tangent.

6. The sheet according to claim 1, wherein the second ply comprises a third series of protrusions having an overall shape of a low wall that projects from the inner face of the sheet, and of which each joins together two high protrusions of the first aligned protrusions which form concentric circles.

7. A pair of engraved rolls for embossing a multiply sheet made of tissue according to claim 1, wherein:

a first roll of the pair of rolls comprises a first series of large pins of frustoconical overall shape that form first juxtaposed sets of concentric circular alignments and second large pins arranged between said sets of concentric circles;

a second roll of the pair of rolls comprises a series of large pins of frustoconical overall shape that form second juxtaposed sets of concentric circular alignments, and a series of small pins arranged between said second sets, wherein the second roll further comprises third pins arranged in the region at the centre of the small pins, wherein in order to emboss the plies, the first and second rolls are keyed so that the large pins of each roll are nested, and wherein the third pins of the second roll and the second large pins of the first roll are also nested.

8. A process for embossing multiply tissue sheets by means of a pair of rolls according to claim 7, comprising:

providing a multiply sheet to be embossed; and passing the multiply sheet through an embossing space between juxtaposed ones of the pair of engraved rolls to form embossed multiply tissue sheets.

9. An embossed sheet, comprising:

at least a first and a second ply of tissue having a basis weight between 12 and 30 g/$m^2$;

the first ply comprising a first embossed pattern comprising a first set and a second set of protrusions having a frustum overall shape, the tops of which are oriented towards an inside of the sheet, wherein the first set of protrusions of the first ply form a series of circles that are concentric in a set of at least 3 circles;

the second ply comprising a first set and a second set of protrusions, the tops of which are oriented towards the inside of the sheet, the second set of protrusions having a height greater than that of the first set of protrusions, wherein the second set of protrusions of the second ply form a series of concentric circles in a set of at least 3 circles that are disposed nested and concentric with respective circles of the series of circles of the first ply to form sets of complementary circles, wherein the first set of protrusions of the second ply are disposed in spaces between the sets of complementary circles;

wherein the second set of protrusions of the first ply are disposed among and nested with the first set of protrusions of the second ply in the spaces between the sets of complementary circles, so as to create empty spaces between the two plies and promote a rapid absorption of liquid.

10. The sheet of claim 9, wherein:

the second ply further comprises a third set of protrusions similar in shape to the second set of protrusions of the second ply, the third set of protrusion of the second ply being centrally disposed and nested with the second set of protrusions of the first ply in the spaces between the sets of complementary circles.

* * * * *